Oct. 12, 1965    H. Z. HIGHT ETAL    3,211,573
PLASTIC LINING OF PIPE
Filed March 5, 1962    5 Sheets-Sheet 1
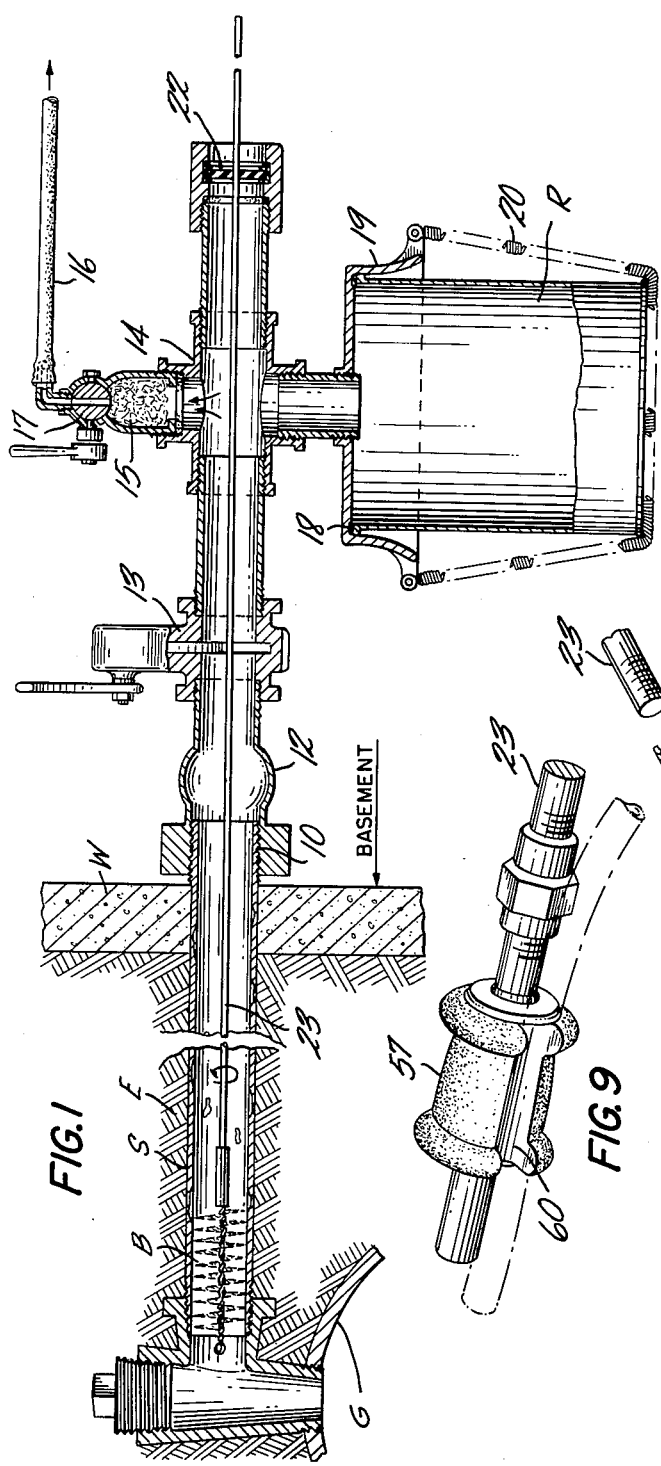
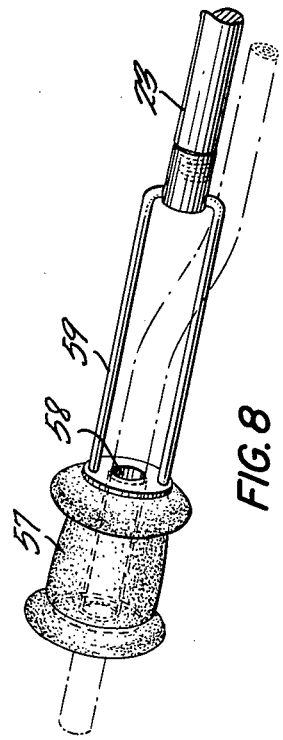
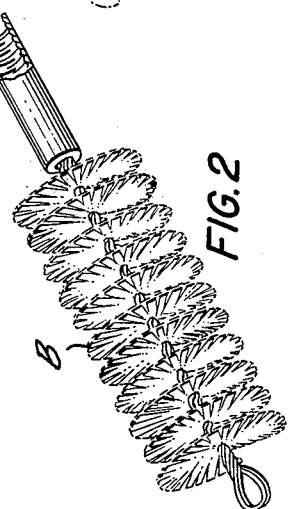
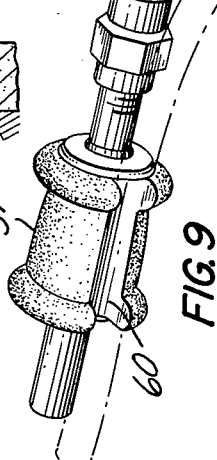
INVENTORS
FREDERICK C. SHAUGHNESSY,
JOHN W. BOGDANOWSKI,
FRED W. HOEHLEIN,
HANFORD Z. HIGHT,
GEORGE W. SHANNON &
BY   MELVIN M. GALLANT
Richard S. Shreve, Jr.
ATTORNEY

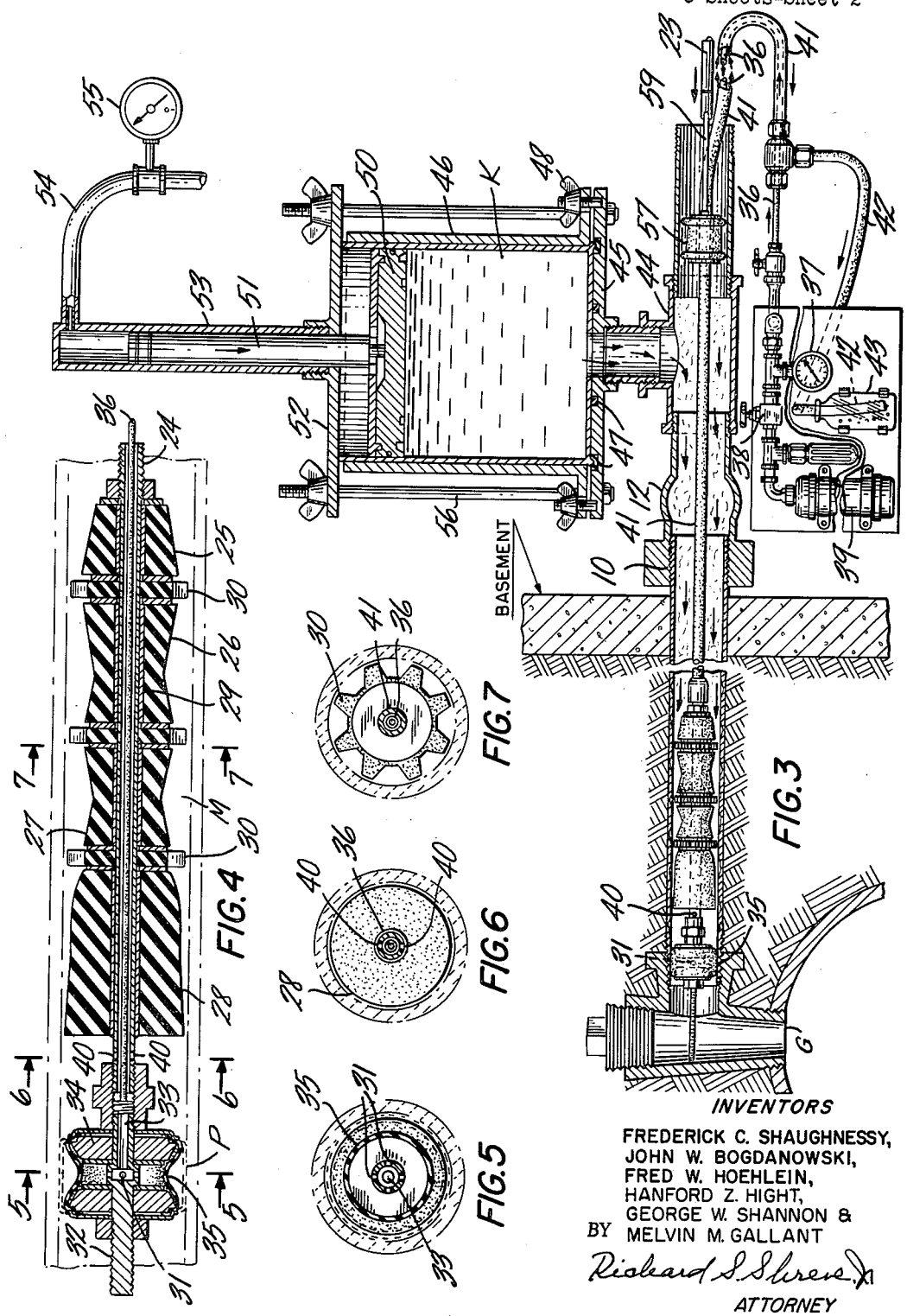

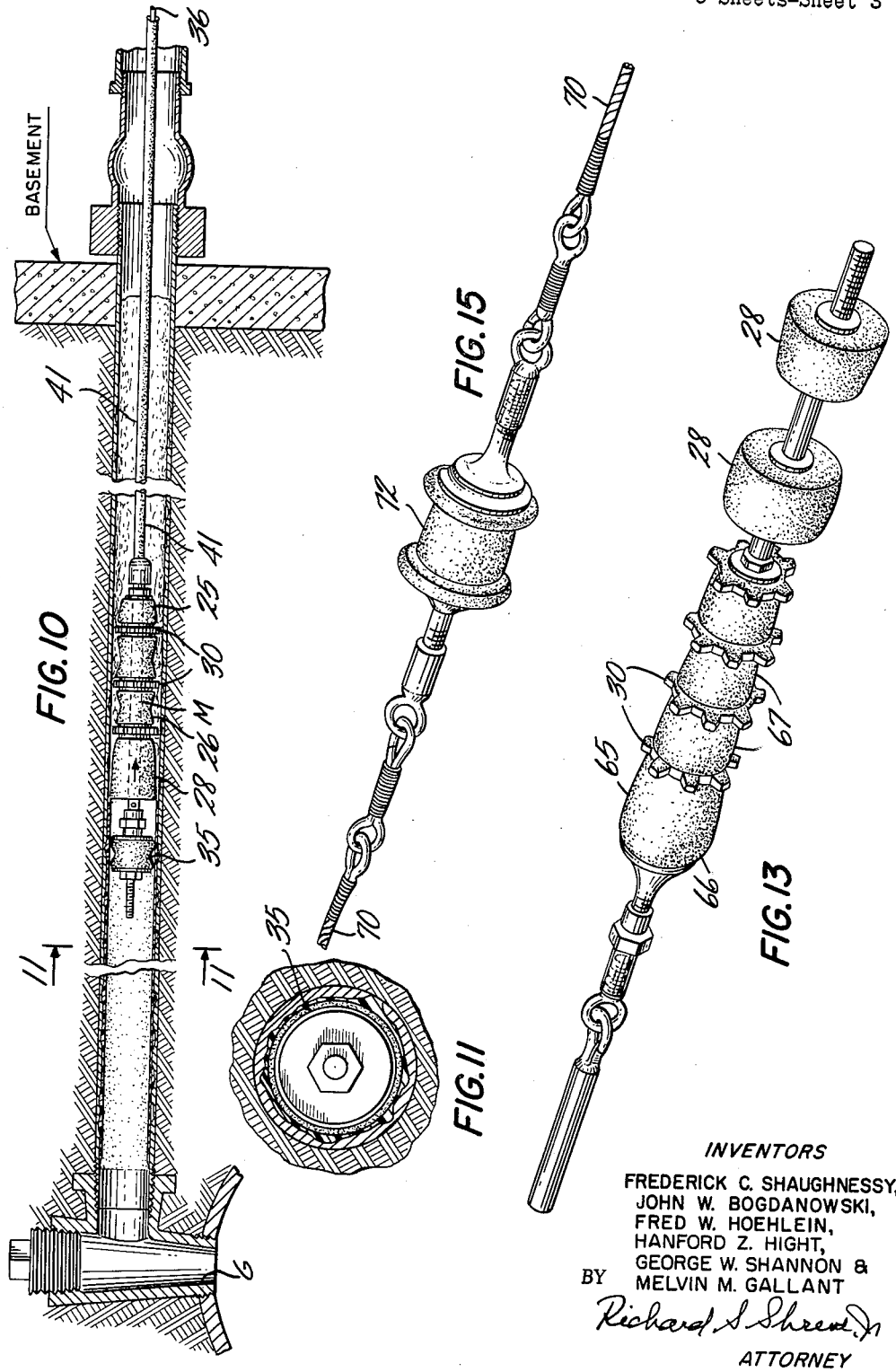

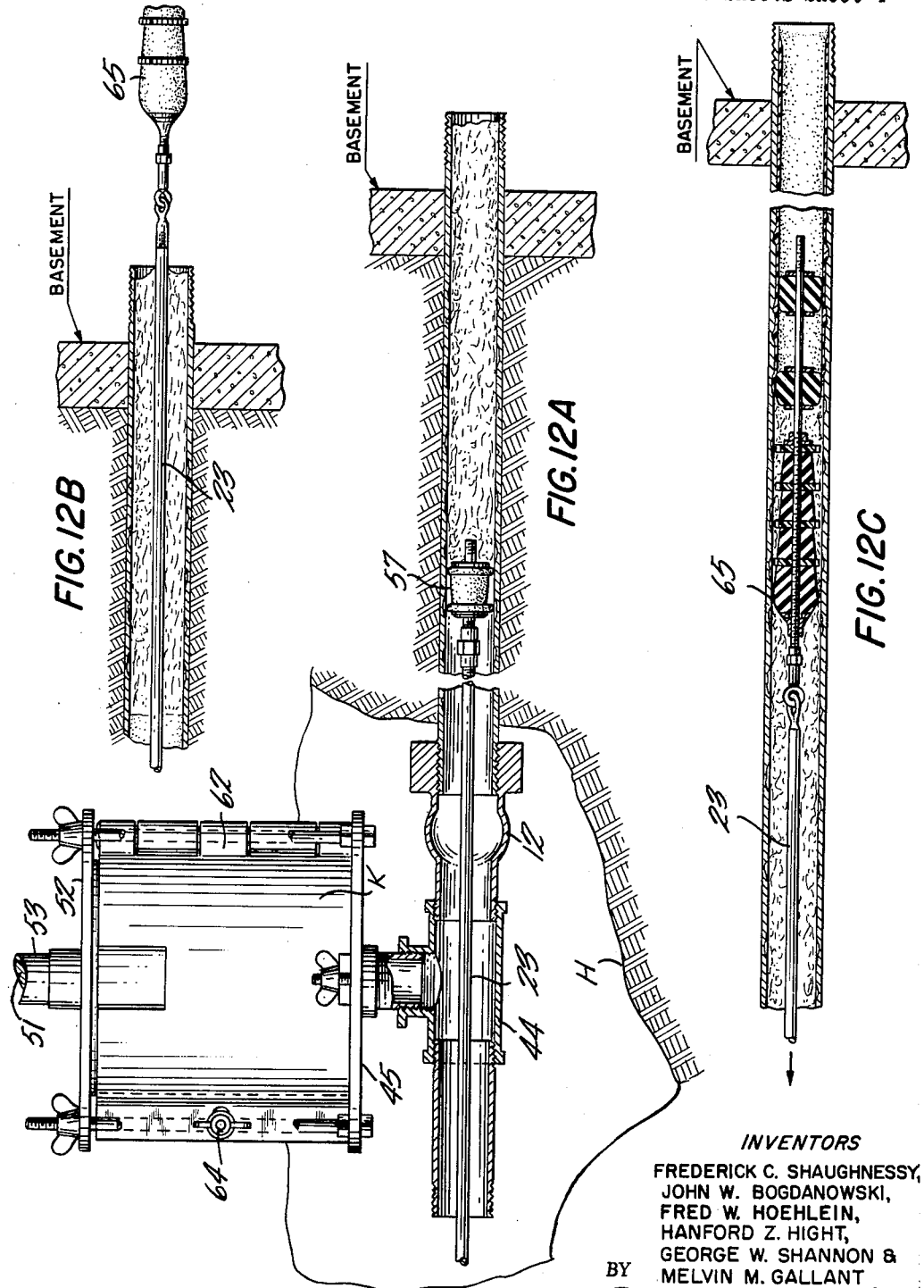

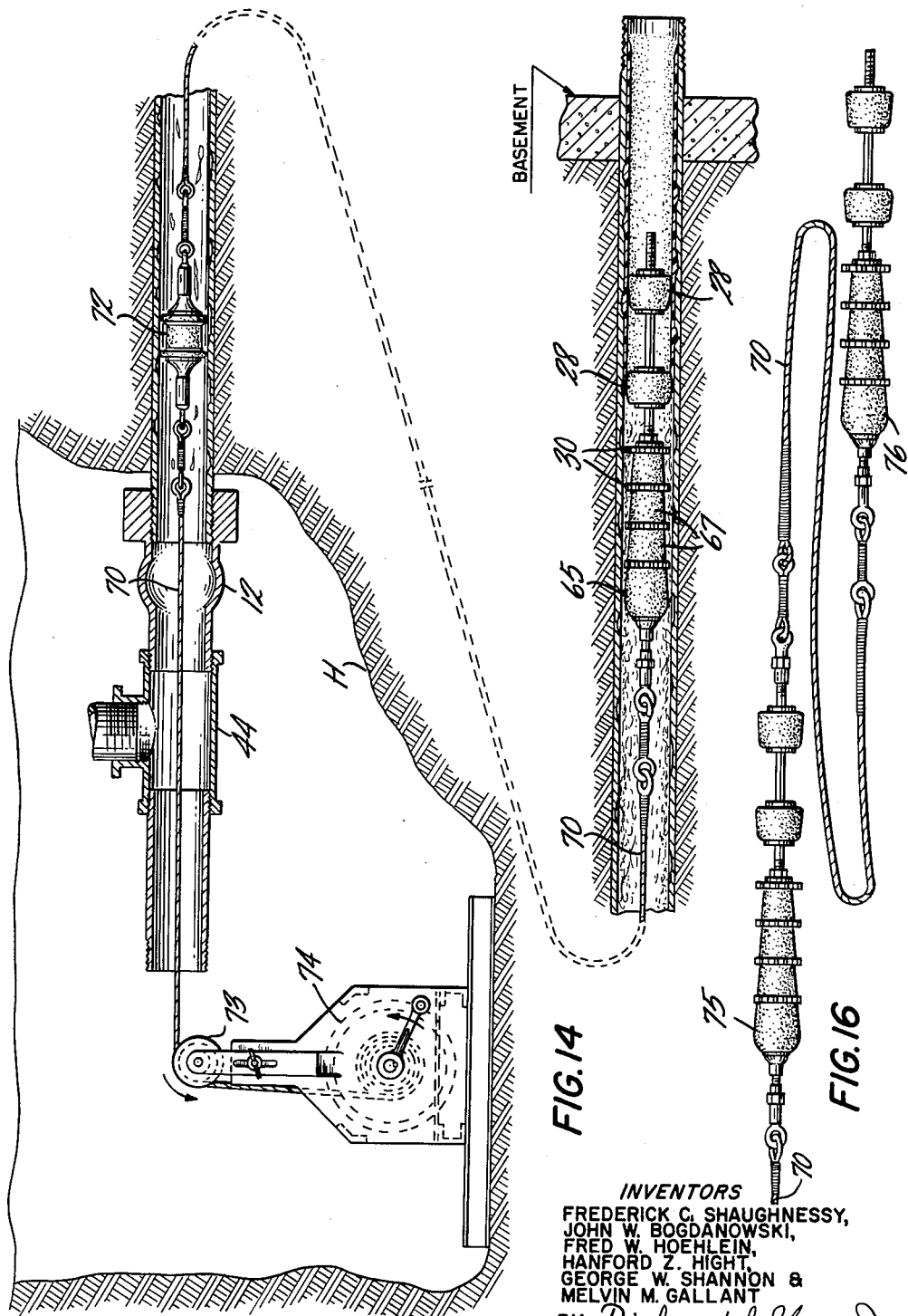

3,211,573
PLASTIC LINING OF PIPE
Hanford Z. Hight, Short Hills, George W. Shannon, West Orange, and Melvin M. Gallant, Orange, N.J., and Frederick C. Shaughnessy, Bronx, John W. Bogdanowski, Flushing, and Fred W. Hoehlein, College Point, N.Y., assignors to Bonded Products, Inc., Orange, N.J., a corporation of Illinois
Filed Mar. 5, 1962, Ser. No. 177,665
18 Claims. (Cl. 117—95)

This invention relates to plastic lining of pipe, and more particularly to expedients of this character for repairing pipe in situ.

In pipe distribution lines for fluids, under various conditions and in the course of time, corrosion forms pits and cavities which ultimately extend through the pipe wall, causing dangerous leaks which must be repaired. To replace the corroded pipe with new pipe not only involves the cost of the new pipe, but also the labor of providing access to the pipe by removing supporting structure, and disconnecting and reconnecting the pipe into the system.

It is therefore the main object of the present invention to repair corroded pipe in situ.

In public utilities systems for combustible gas, a gas service line is the buried pipe which connects the home of the user with the main gas line, which main is a number of feet beneath the surface of the street. The length of this service pipe varies and may range from 20 to 100 ft. in length. With time and corrosive soil conditions, these pipes corrode and allow dangerous gas to leak.

An obvious expedient for repairing these leaks is by complete removal of bad pipe and replacement with new pipe, but a serious objection to this is the cost. The time and manpower necessary to a service added to the value of the new pipe, is prohibitive.

Another expedient for repairing those leaks is by insertion of a small diameter pipe or tubing in the old pipe. With this, many problems however have been encountered. Plastic tubing tends to cold flow, stress crack and be cut on rough, sharp burrs in the pipe. Copper tubing, on the other hand, is more expensive, more difficult to handle and has a tendency to kink when bent sharply.

Both tubings have the added difficulty of the necessity of applying fittings at each end of the pipe, and if these fittings are not expertly applied, the repair is completely useless. Also an annular space exists between the old and new pipes. Furthermore, this tube insertion necessitates digging a hole in the street to apply a fitting to the end of the tube near the main. This condition is costly and inherent in the use of tubing.

Such digging holes or trenches results in damage to lawns and pavements, requires replacement of the removed earth, and presents hazards and obstructions to traffic and pedestrians, inconvenience to consumers and the general public, with resulting deterioration of public relations.

It is therefore another object to avoid these disadvantages, and to repair leaky or corroded underground pipe without removing the same.

The present invention eliminates the difficulties associated with other expedients for service pipe repair by applying a plastic lining to the surface of pipe which literally renews the old pipe and stops all leaks. Basically, the coating or laminating procedure is accomplished by the following technique. After cleaning the pipe, an applicator with a wire attached is sent to the end of the pipe, liquid plastic is forced into the pipe up to the applicator, the applicator is then pulled back, distributing the plastic evenly on the walls of the pipe. Within 24 hours, the plastic hardens to an impermeable film.

In some instances, the pipe is corroded away to the extent that it is practically disappeared. In other words, the packed clay is really conducting the gas from the main into the house and later it is this packed clay which we line without any pipe as such being present.

The new liner is literally fused to the old pipe so no gas can escape between the coating and the pipe. No fittings are necessary at the ends of the coating to prevent leakage. The repair material can be contained in two or three gallons and is not difficult to transport. No jagged burrs can cut into the coating since the coating envelopes all protrusions in the pipe.

The coating takes the shape of the pipe and does not twist or kink even if the pipe is bent or trapped. If, for any reason, the pipe still leaks, the operation can simply be repeated. Nothing has to be removed from the pipe; the coating is done over the previously applied coating. The liquid plastic mushrooms through holes in the pipe and thus covers the outside area around the hole, protecting it from further degradation.

In such gas distribution, the gas from the supply is piped through mains, from which service lines are taken off to separate consumers. The mains being under pressure, it is necessary to seal off the main before repairing the service pipe. It is therefore another object of the invention to seal off the main by operation inside the pipe from the service end to effect the seal at the main end of the service pipe.

For this purpose, the present applicator is modified with a balloon and all operations are conducted through a stuffing box. After cleaning the pipe, the applicator is inserted into the pipe and the pipe is blocked off at the main by blowing up a balloon attached to the applicator. The liquid plastic is forced into the pipe and up to the applicator; it cannot go beyond the applicator because of the balloon. At this point, the balloon is deflated and the applicator pulled out, thereby distributing an even lining of plastic on the wall of the pipe. After removal of the applicator, the stuffing box is removed and the pipe is immediately returned to service.

Thus, in general, according to the present invention, an elongated tubular cavity is lined by inserting an applicator through an exposed end of the cavity, propelling the applicator along inside the cavity to a position adjacent to the other end thereof, passing a charge of lining material into said exposed end, propelling said charge along inside the cavity on against the applicator to load the same, and propelling the applicator in the reverse direction toward said exposed end to spread the charge and line the inside of the cavity.

When the pipe is a gas service line leading from a gas main both embedded in the earth, the applicator is propelled inside the line to a position adjacent the gas main. When the service line and gas main are both under gas pressure, the pipe is sealed beyond the applicator against gas pressure from said main until the applicator is loaded, and unsealed before the applicator is returned toward the exposed end. This sealing is preferably effected by inflating an expansible bellows, preferably by a controlled or valved source of pressure of limited quantity outside of said exposed end through a tube leading therefrom inside the pipe to the bellows.

The liner applicator preferably comprises a hollow core provided with a vent between the bellows and the applicator, and connected by a tube having the inflation tube inside thereof, to exhaust outside of said exposed end. These tubes are preferably passed through a diaphragm cap, and the applicator is attached to the tubes. The cap is applied to the open end of the pipe before the applicator is propelled to the gas main end of the pipe and loaded, and the applicator is returned for the lining stroke by tension on said tubes.

In the drawings:

FIG. 1 is a vertical section through an underground pipe, showing apparatus according to, and for carrying out the method of cleaning the pipe;

FIG. 2 is a perspective view of the cleaning brush employed in FIG. 1;

FIG. 3 is a vertical section similar to FIG. 1, but showing apparatus according to, and for carrying out the method of, lining the pipe;

FIG. 4 is an axial section through the lining applicator shown in FIG. 3;

FIGS. 5, 6 and 7 are radial sections taken along the corresponding lines of FIG. 4;

FIG. 8 is perspective view of the plunger shown in FIG. 3;

FIG. 9 is a similar view of a modified form of FIG. 8;

FIG. 10 is a view similar to FIG. 3 but showing the step and position of application of the lining;

FIG. 11 is a radial section taken along line 11—11 of FIG. 10;

FIG. 12A, B and C are views similar to FIG. 3 showing successive steps of a modification;

FIG. 13 is a perspective view of a modification of the application shown in FIGS. 3 and 4;

FIG. 14 is a view similar to FIG. 3 but showing a further modification;

FIG. 15 is a further modified form of the plungers shown in FIGS. 8 and 9; and

FIG. 16 is a coiled view of a tandem applicator modification.

In the form shown in FIG. 1, a gas service line S is shown as leading from a gas main G both embedded in earth E, with the outlet end 10 thereof passing through a basement wall W, or any other wall, curb or earth bank at which a termination is provided, or may be effected, and such end is exposed and accessible. An adapter fitting 12 is applied to the outlet end 10, and a full opening valve 13 is mounted on the adaptor fitting 12.

To the outlet from the valve 13 is connected a four-way branch or cross fitting 14, the top of which is connected to a vent nipple fitted with coarse steel wool or other suitable filtering media 15 to filter or screen out any foreign matter, such as rust or scale, and a vent hose 16 is connected through valve 17 to the vent nipple. The vent line 16 may be connected to a remote safety burner at which point, gas may be safely ignited and burned. The bottom of the cross 14 is connected to a waste receptacle R for collecting the scale, which comprises a removable can having an upper rim engaging a gasket 18 in a lid 19 carried by the cross 14, and the can is held in place by springs 20 carried by the lid 19.

The outlet end of the cross is closed by a cap containing a centrally apertured flexible resilient diaphragm 22, consisting of one or more sections of flexible material suitably spaced. Through the aperture and the open valve 13 passes a thrust rod 23, preferably of reinforced fiber glass, and a cleaning tool or scraper, such as a spirally wound wire brush B is secured on the inner end of the rod 23.

In setting up for operation, the service pipe S is made available either by cutting it at the property line or any desired point, or by taking the fitting off the head of service in the basement, or by attaching a suitable nipple to the terminal fitting at the head of the service. Immediately thereafter to prevent the escape of gas, a conventional type stopper is put into the service pipe S. This stopper is merely an expanding plug device which is inserted inside the pipe and expanded to seal off the gas.

To the thus sealed end 10, the fitting 12 and valve 13 are applied. Once the valve is installed, the conventional stopper is removed and the valve is shut. Then to this valve are connected the further elements shown including the can R, and the vent line 16 to take the gas away from the working area.

With the valve 13 closed, the diaphragm cap 22 is removed and the rod 23 inserted through the central aperture in the diaphragm, and the brush B is attached to the front end of the rod. The brush is inserted through cross 14, and the cap 22 replaced. The valve 13 is then opened, and the brush B is pushed by the rod 23 into the service line 10, the gas being retained by the diaphragm cap 22 and valve 17, or vented through hose 16.

The pipe cleaning operation with the brush B comprises turning the rod to screw the spiral brush into the scale to advance the brush for an increment such as a brush length, and then pulling the brush back out to dislodge the scale and propel the same toward the discharge end, and finally dumping the scale into the container R. The brush must be advanced through the scale and then pulled back, because otherwise the brush would push the scale ahead thereof into the fittings of the main, which could cause a permanent stoppage.

This operation is repeated for successive increments until the inner end of the service pipe is reached. For heavy scale deposits, a tapered brush may be desirable, or a small starting brush pass followed by successive passes of increasing size brushes. The cleaning with heavy wire brushes of steel or non-sparking material such as bronze or beryllium copper, is preferably followed up with a very light duster brush to remove fine light particles of scale.

All this time, the gas is either being vented into the air or burned with a suitable safety burner at a remote location. The pressure of the gas is an advantage in the cleaning operation. Oftentimes, the scale may pile up in a mass and lock the brush. The positive pressure of the gas or the velocity of flow due to the pressure of the gas, even though only a quarter pound per square inch or so, is sufficient to cause a jet action which prevents jamming or locking of the scale in the pipe.

Now that the cleaning operation is completed, the brush B is pulled back against the diaphragm 22 to permit closing of the valve 13. Then the diaphragm 22 is taken off, the brush B removed from the rod 23, and the container R emptied of the scale.

As shown in FIG. 4, for the application of the lining material to the inside of the cleaned pipe, an applicator M is provided which comprises a hollow core 24 on which are mounted successive wiper elements comprising a pointed tapering nose 25, intermediate spacers 26 and 27, and a final spreader 28. These are preferably formed of resilient material such as rubber, and mounted on a supporting hollow core metal tube 24. As shown in FIG. 7, between these wiper elements are mounted centering guides 30 of substantially star shape. These are preferably of a resilient material such as rubber or plastic.

Mounted on the inner end of the applicator core 24 ahead of the spreader 28 is a radially expansible stopper P comprising a central rod 32 having a bore 33 connected to the interior of the hollow core 24. In the form shown, a pair of disks 34 are spaced apart on the rod 32 and surrounded by a bag or band 35 of resilient film such as rubber or plastic to form a ballon or bellows. Radial bores 31 connect the bore 33 to the interior of the bellows 35.

The bore 33 is connected by an air line 36 passing through the tube 24 on out through the structure shown in FIG. 3 to a pressure gauge 37 and valve 38 to a pressure tank 39. The air line 36 is constructed of pressure tubing of high tensile strength, which will not kink or stretch, preferably of plastic such as nylon. The pressure tank 39 supplies carbon dioxide, nitrogen, air or any other suitable gas or liquid to inflate the bellows 35.

In the applicator M between the stopper P and the spreader 28, or between spreader 28 and centering guide 30, the hollow core is provided with vents 40, and the nose end of the core 24 is connected to an outer line 41 of the same material as the line 36, and which contains the line 36, leaving an annular passage therebetween. The other end of the outer line 41 is connected to a branch line 42 which is immersed in water in a glass bottle 43.

The lining material is a chemical and solvent resistant, adhesive, self-hardening paste-like, thixotropic coating material of high dielectric and tensile strength, capable of being spread over the inside of the pipe to fill in pits or holes therein and to exude through such holes to adhere to the outside of the pipe surrounding such holes, and is preferably a plastic such as epoxy resin composition.

The material loading mechanism as shown in FIG. 3 comprises a supply tank K containing the material for lining the pipe S. The bottom of the tank is connected to a pipe T 44 which is connected onto the adaptor fitting 12 in place of the cross 14 of FIG. 1. In the form shown, the supply tank K is formed by a replaceable can or shipping container of commercial quantity unit size, fitted into a socket or holder formed by a flat base plate 45 and a flanged sleeve 46. The base plate 45 is centrally bored and topped to receive a nipple connected to the top of the T 44, and having gaskets 47 on which the bottom of the replaceable can rests. The flange of the sleeve is secured to the base plate by wing nuts 48.

The can being installed has the top cut off, and the bottom punctured to drain into the T 44. A piston 50 is fitted inside the can, and has an upstanding plunger 51 slidable through a lid 52 into a tube 53 thereabove. The top of the plunger is pressurized by a line 54 from a source of fluid pressure indicated by a gauge 55. The lid 52 is secured to the base plate 45 by bolts 56, and holds the can therebetween.

The pipe length connected in the other end of the T 44 is shown as receiving a plunger 57 mounted on the front end of the rod 23. This plunger passes over or along the hose 41, which as shown in FIG. 8, is received in a central bore 58 cleared by a bail 59, or as shown in FIG. 9, is received in a side groove 60.

With the loading mechanism in place on the adaptor fitting 12, the outer tube 41 with the inner tube 36 inside thereof is put through the diaphragm of cap 22. Then the end of inner tube 36 is threaded through the rigid tube 24 to connect with the bore 33, and the end of the outer tube 41 is connected to the outer end of the tube 24. The cap 22 is replaced, and the applicator is positioned adjacent to the loading device. Then by means of the tubing or if necessary, reinforced with a conventional snake, the applicator is pushed down to the extreme length of the service at the main, as shown in FIG. 3.

The projecting length of the stopper rod 32 is predetermined to abut the inside of the fitting at the main, as a gauge to space the expansible stopper P in the desired or preferred position. The bellows 35 is then inflated through inner line 36 with gas from the pressure tank 39. This stops any gas from within the gas main G from flowing into the working space.

At this point, the diaphragm cap 22 is removed off of the tubing 41, and instead a conventional split ring is screwed into the inlet of the T 44 to prevent the material from backing out during loading. Then the piston 50 of the loading mechanism is operated to introduce the material into the service pipe.

When a charge of the sufficient amount of material is fed into the service line, then the next step is to push that material down toward the applicator which is in place at the main. This is done with the plunger or ram 57 shown in either FIG. 8 or FIG. 9. The plunger distributes the mass of material along the length of the service pipe and causes it to wet the surface of the pipe.

As the material is pushed down toward the applicator, the air or any gas or air-gas mixture such as inert gas which may be present in the pipe, is compressed between the bellows 35 on the applicator and the advancing material. This trapped gas is vented at 40 out through the outer tube 41 and bubbles through the liquid in the bottle 43. This bubbling is important because when the material reaches the proper position which is over and just barely beyond the applicator, the vent hole is closed by the material arriving at that point. Hence, when the bubbling stops because the material has closed the vent, the plunging of the material can be stopped because it has reached its ultimate position. The inflated bellows here prevents the material from going into the main and causing a stoppage.

The mandrel being thus charged with lining material, the rod 23 is pulled out to remove the plunger 57. Then the tubing is disconnected at the position of the valve 38, which releases the pressure, to deflate the bellows 35, leaving the charge of material to prevent gas flowing out into the working area. Then the tube 41 is removed from the bottle 43, following which the tube 41 is pulled to propel the mandrel toward the open end 10 as shown in FIG. 10.

The nose 25 spreads the material radially, and the star shaped guides 30 spread the material circumferentially. The converging and diverging surfaces of the spacers 26 cause working of the plastic into pits and holes in the service line as shown in FIG. 11. The final spreader 28 provides a uniform inner diameter lining for the pipe.

The applicator finally is pulled completely out of the service pipe, and immediately the conventional expansible stopper is inserted in the service pipe to shut off the flow of gas. Then the work is completed and the line can be connected in accordance with normal gas operating procedures.

When a hole is dug at the gas main end of the line, for access to the main for repair or replacement as shown at H in FIG. 12A, the service line 10 is open at both ends, and there is no gas pressure. Under these conditions, and when the line is short, say 10 ft., the arrangement shown in FIG. 12A is employed.

In FIG. 12A the sleeve containing the package K is shown in two halves hinged together at 62 at one side, and secured together at the other side by a wing nut 64. The adaptor fitting 12 and the pipe T 44 for the loading mechanism are applied to the gas main end of the line 10, and the charge loaded into the line.

Then the plunger 57 on rod 23 is inserted from the main end, to push the charge on to the service end as shown in FIG. 12A. Then the rod 23 is pulled back, and the plunger 57 removed, after which the rod is thrust on through the charge and out through the service end.

The mandrel M or the alternate modified mandrel 65 shown in FIG. 13 is hooked onto the projecting rod 23 as shown in FIG. 12B. Now the rod 23 is pulled back toward the gas main end as shown in FIG. 12C, to spread the charge evenly over the inside of the service line 10. The modified applicator 65 as shown in FIG. 13 has a nose 66 and spacers 67 separated by centering guides 30, followed by tandem spreaders 28.

As shown in FIG. 14, where there is a hole H and a long sleeve line, say from 10 to 60 ft. or longer, a flexible cable 70 may be used instead of the rod 23. The cable is pushed through the long line by a conventional snake, and the ram 72 shown in FIG. 14 is hooked into the line outside of the loading T 44 which delivers a charge into the service pipe. The cable 70 is then pulled to draw the ram 72 to drag the charge to the service end of the pipe.

Then the service end of the cable 70 is hooked onto the applicator 65, while the gas main end of the line is passed over a centering pulley 73 to a winch 74, which pulls the line and the applicator to spread the charge over the inside of the pipe. When the ram 72 emerges at the gas main end, the winch is halted, the ram unhooked, and the line ends hooked together so as to pass over the pulley 73. The winch is then continued to pull the line until the applicator comes out of the pipe through the loading T 44.

With this flexible cable, it has been found that on a long service line, such as sixty feet or longer, where there is a large mass of material in the pipe, there is too much material pressure against the applicator. The result is that when the winch starts to pull, the material tends to squeeze by or slop over beyond the applicator instead of feeding in the proper manner. This is eliminated by the tandem applicators shown in FIG. 16. With this provision, the first applicator 75 serves to break up the material and start the mass moving with only the right amount of material left for the second applicator 76 to finally apply to the inside of the service pipe.

The tandem applicators may also be used when working against gas pressure as shown in FIG. 3, using the inner and outer tubing to inflate the expansible stopper and to vent the air. The two tubes would pass through the leading applicator to the second applicator, with the second applicator rigged with the expansible stopper as shown in FIG. 4. The rigid tube 24 of the first applicator would be connected by a piece of tubing to the tube 24 of the second applicator to provide for the venting. The inner tube which inflates the stopper would run right through the leading applicator to the final applicator for inflating the stopper. Any or all of the operations performed where both ends of the service pipe are accessible may be pursued in the reverse direction, if more convenient to do so.

What is claimed is:

1. Method of lining and elongated tubular cavity containing fluid under pressure and having an exposed end, which comprises inserting an applicator through said exposed end while maintaining said exposed end sealed against the escape of fluid, applying sliding thrust through said sealed exposed end for propelling said applicator along inside the cavity to a position adjacent the other end thereof, applying fluid pressure for passing a charge of thixotropic lining material into said cavity ahead of said sealed exposed end, applying sliding thrust for propelling said charge along inside the cavity on against the applicator to load the same, and propelling the applicator in the reverse direction toward said exposed end to spread the charge and line the inside of said cavity.

2. Method of lining a substantially horizontal gas service line having an exposed end and leading from a gas main both embedded in the earth and containing gas under pressure, which comprises inserting an applicator through said exposed end, sealing said exposed end against escape of gas therefrom, applying sliding thrust through said sealed exposed end for propelling said applicator along inside said gas service line to a position adjacent said gas main, applying fluid pressure for passing a charge of thixotropic epoxy resin composition into said service line, applying longitudinal force ahead of said sealed exposed end and behind said charge and thereby propelling said charge along inside said gas service line on against the applicator to load the same and seal off the gas from said main, and propelling said applicator in the reverse direction to spread said thixotropic epoxy resin composition onto the inside of said gas service line to fuse thereto and mushroom through any holes therein and cover the outside area around such hole.

3. Method of lining an elongated tubular cavity having an exposed end and leading from a far end under fluid pressure, which comprises inserting an applicator carrying a sealer through said exposed end, propelling said applicator and tubes trailing the same to a position adjacent said far end and there actuating said sealer, passing a charge of lining material into said cavity, propelling said charge along inside said cavity against said applicator adjacent said far end to load said applicator and reseal said far end, thereafter releasing said sealer, and thereafter propelling said applicator and said released sealer in the reverse direction away from said resealed far end, to spread the charge and line the inside of said cavity.

4. Method of lining an elongated tubular cavity having an exposed end, which comprises inserting an applicator carrying a bellows through said exposed end, propelling said bellows and applicator in tandem along inside the cavity to a position adjacent the other end thereof and there inflating said bellows, thereafter passing a charge of lining material into said cavity, propelling said charge along inside the cavity on against said applicator to load the same, thereafter deflating said bellows, and thereafter propelling the applicator in the reverse direction toward said exposed end to spread the charge and line the inside of said cavity.

5. In a method of lining an elongated tubular cavity having an exposed end, the improvement steps which comprise inserting through said exposed end an applicator carrying a bellows and a tube therefor, propelling said applicator and bellows along inside the cavity with the tube in trailing relation thereto to position the same adjacent the other end thereof, and there inflating said bellows through said trailing tube inside the pipe.

6. Method of lining an elongated tubular cavity having an exposed end, which comprises inserting through said exposed end an applicator having a hollow core with a vent ahead of said applicator and a trailing tube connected to said hollow core, propelling said applicator and tube along inside said cavity to a position adjacent the other end thereof, passing a charge of lining material into said exposed end, propelling said charge along inside said cavity on against the applicator to load the same, thereby pressurizing the air in said cavity ahead of said charge to pass through said vent, hollow core and trailing tube on out through said exposed end, and thereafter propelling said applicator in the reverse direction toward said exposed end to spread the charge and line the inside of said cavity.

7. Method of lining an elongated tubular cavity having an exposed end and leading from a far end under fluid pressure, which comprises passing a tube through an aperture in a diaphragm cap for said exposed end, attaching an applicator to said tube, inserting said applicator through said exposed end, applying said diaphragm cap to said open end, propelling said applicator along the inside of said cavity to a position adjacent said far end with said tube following through said aperture, passing a charge of lining material into said exposed end ahead of said diaphragm cap, propelling said charge along inside said cavity on against said applicator to load the same, and applying tension to said tube for propelling said applicator in the reverse direction toward said exposed end to spread the charge and line the inside of said cavity.

8. Method of lining an elongated tubular cavity having an exposed end, which comprises inserting through said exposed end an applicator having a hollow core with a vent ahead of said applicator and a bellows ahead of said vent with an outer tube connected to said core and an inner tube connected to said bellows, propelling said applicator and tubes trailing the same to a position adjacent the other end of said cavity and there inflating said bellows through said inner tube, passing a charge of lining material into said exposed end, propelling said charge along inside said cavity and outside of said outer tube on against said applicator to load the same, thereby pressurizing the air in said cavity between said charge and said bellows to pass through said vent, hollow core, and trailing outer tube, thereafter deflating said bellows, and thereafter applying tension to said outer tube for pulling said applicator and deflated bellows in the opposite direction away from said far end to spread the charge and line the inside of said cavity.

9. Method of lining an elongated tubular cavity having exposed near and far ends, which comprises passing a cable through said cavity from said near end to said far end, attaching a ram to the near end of said cable, delivering a charge of lining material to said cavity ahead of said ram, pulling said cable through said far end to drag the charge to said far end, attaching an applicator to said cable at said far end, and pulling said cable in the reverse direction to spread said lining material over the inside of said cavity.

10. Method of lining a substantially horizontal gas service line having an exposed end and leading from a gas main both embedded in the earth, which comprises attaching a material container by a branch fitting to said exposed end, passing a propelling member through an aperture in a diaphragm cap, attaching an applicator to said propelling member, passing said connected members through said branch fitting, attaching said cap to said branch fitting, propelling said member through said cap on longitudinally inside said service line to position said applicator adjacent said gas main, applying fluid pressure in said container for passing lining material through said branch fitting into said service line, applying longitudinal force against said lining material to push the charge along said service line outside of said propelling member to load said applicator, and applying tension to said propelling member to pull said applicator in the reverse direction toward said branch fitting to spread the charge and line the inside of said service line.

11. Apparatus for lining an elongated tubular cavity having an exposed end, which comprises an applicator inserted through said exposed end, means for sealing said exposed end, means for applying sliding thrust through said sealed end for propelling said applicator along inside the cavity to a position adjacent the other end thereof, means for passing a charge of lining material into said exposed end, means for propelling said charge along inside the cavity on against the applicator to load the same, and means for propelling the applicator in the reverse direction toward said exposed end to spread the charge and line the inside of said cavity.

12. Apparatus for lining a gas service line having an exposed end and leading from a gas main both embedded in the earth, which comprises an applicator inserted through said exposed end, means for sealing said exposed end, means for applying sliding thrust through said sealed end for propelling said applicator along inside said gas service line to a position adjacent said gas main, means for applying fluid pressure for passing a charge of lining material into said gas service line, means for applying longitudinal force ahead of said sealed end and behind said charge along inside said gas service line on against the applicator to load the same and seal off the gas from said main, said sliding thrust means being reversely operable for propelling the applicator in the reverse direction toward said exposed end to spread the charge and coat the inside of said gas service line.

13. Apparatus for lining an elongated tubular cavity having an exposed end, which comprises an applicator inserted through said exposed end, means for sealing said exposed end, means passing through said sealed end for propelling said applicator along inside the cavity to a position adjacent the other end thereof, means carried by said applicator for sealing off said other end, means for applying fluid pressure for passing a charge of lining material into said cavity, means for applying longitudinal force to said charge to load said applicator and reseal said other end, said sealing means carried by said applicator being released, and said means passing through said sealed end being reversible for propelling said loaded applicator toward said sealed end to spread the charge and line the inside of said cavity.

14. Apparatus for lining an elongated tubular cavity having an exposed end, which comprises an applicator inserted through said exposed end, means for sealing said exposed end, a tube passing through said sealed end for propelling said applicator along inside the cavity to a position adjacent the other end thereof, an expansible bellows carried by said applicator for sealing off said other end, means for applying fluid pressure for passing a charge of lining material into said cavity, means for applying longitudinal force to said charge to load said applicator and reseal said other end, said bellows being deflated through said tube, and said tube being withdrawn through said sealed end to pull said applicator and bellows in the reverse direction to spread the charge and line the inside of said cavity.

15. Apparatus for lining an elongated tubular cavity having an exposed end, which comprises an applicator inserted through said exposed end, means for sealing said exposed end, a tube passing through said sealed end for propelling said applicator along inside said cavity to a position adjacent the other end thereof, and expansible bellows carried by said applicator and connected to said tube, a valved source of pressure outside of said exposed end and connected to said tube for inflating said bellows to seal off said other end, means for applying fluid pressure for passing a charge of lining material into said cavity, and means for applying longitudinal force to said charge to load said applicator and reseal said other end.

16. Apparatus for lining an elongated tubular cavity having an exposed end, which comprises an applicator inserted through said exposed end, means for sealing said exposed end, an outer tube passing through said sealed end for propelling said applicator along inside of said cavity to a position adjacent the other end thereof, an expansible bellows carried by said applicator, said applicator having a hollow core with a vent between said bellows and said applicator and connected to said outer tube, and an inflation tube inside said hollow core and outer tube and connected to said bellows.

17. Apparatus for lining an elongated tubular cavity having an exposed end, comprising a diaphragm cap for said exposed end having an aperture therein, an applicator inserted through said exposed end, an outer tube passing through said aperture for propelling said applicator along inside of said cavity to a position adjacent the other end thereof, an expansible bellows carried by said applicator, said applicator having a hollow core with a vent between said bellows and said applicator and connected to said outer tube, and an inflation tube inside said hollow core and outer tube and connected to said bellows.

18. Apparatus for lining an elongated tubular cavity having an exposed end, an applicator insertable through said exposed end for receiving a load and returning to spread the load, comprising a core, wiper elements mounted on said core comprising a leading pointed nose, intermediate spacer elements, and a final spreader, substantially star shaped centering guides on said core interposed between said wiper elements, and an expansible sealer connected to said core in trailing relation to said final spreader.

References Cited by the Examiner

UNITED STATES PATENTS

| 243,209 | 6/81 | Chadwick | 15—162 |
| 1,687,102 | 10/28 | Meurer | 117—95 X |
| 1,746,071 | 2/30 | Cotton | 118—105 |
| 1,796,338 | 3/31 | Moore | 117—95 |
| 2,106,004 | 1/38 | Inglee. | |
| 2,631,114 | 3/53 | O'Brien | 134—8 |
| 2,915,422 | 12/59 | Stone | 134—8 |
| 2,950,702 | 8/60 | Ferguson et al. | 118—408 |
| 2,963,725 | 12/60 | Bredtschneider | 15—104.1 |
| 3,041,204 | 6/62 | Green | 117—97 |
| 3,055,339 | 9/62 | Pistole et al. | 118—105 |
| 3,079,888 | 3/63 | McLean | 118—408 X |

FOREIGN PATENTS 912,953  5/46  France.

RICHARD D. NEVIUS, *Primary Examiner.*